United States Patent [19]
Stephens et al.

[11] Patent Number: 6,124,383
[45] Date of Patent: *Sep. 26, 2000

[54] CEMENT COMPOSITION AND PROCESS THEREWITH

[75] Inventors: Michael L. Stephens; Howard F. Efner, both of Bartlesville, Okla.

[73] Assignee: Phillips Petroleum Company, Bartlesville, Okla.

[ * ] Notice: This patent issued on a continued prosecution application filed under 37 CFR 1.53(d), and is subject to the twenty year patent term provisions of 35 U.S.C. 154(a)(2).

[21] Appl. No.: 09/220,867

[22] Filed: Dec. 23, 1998

[51] Int. Cl.⁷ ............................. C04B 24/26; C09K 7/02; C08F 220/06; C08F 226/06; C08F 220/54
[52] U.S. Cl. ................................. 524/5; 524/4; 523/130; 526/260; 526/265; 526/307.5; 526/307.6
[58] Field of Search ...................................... 523/130, 131; 524/4, 5; 526/260, 265, 307.5, 307.6

[56] References Cited

U.S. PATENT DOCUMENTS

| | | | |
|---|---|---|---|
| 4,267,295 | 5/1981 | Gallop et al. | 526/307.5 |
| 4,644,020 | 2/1987 | Stahl | 523/130 |
| 4,831,077 | 5/1989 | Ball et al. | 526/307.5 |
| 4,861,378 | 8/1989 | Watanabe et al. | 524/4 |
| 4,951,921 | 8/1990 | Stahl et al. | 523/130 |
| 5,087,603 | 2/1992 | Izubayashi et al. | 503/226 |
| 5,268,437 | 12/1993 | Holy et al. | 526/307.6 |
| 5,270,414 | 12/1993 | Saito et al. | 526/260 |
| 5,284,900 | 2/1994 | Izubayashi et al. | 524/492 |
| 5,358,566 | 10/1994 | Tanaka et al. | 524/5 |
| 5,391,437 | 2/1995 | Miyasaka et al. | 428/425.5 |
| 5,473,032 | 12/1995 | Bedeke et al. | 526/307.5 |

OTHER PUBLICATIONS

Austenal Laboratories, Incorporated v. Nobilium Processing Company of Chicago et al. (DC NIll) 115 USPQ 44, 1957.
Petrolite Corporation v. Watson, Comr. Pats. (DC DC) 113 USPQ 248, 1957.

*Primary Examiner*—Peter A. Szekely
*Attorney, Agent, or Firm*—A. W. Umphlett

[57] ABSTRACT

A composition comprising a polymer which comprises repeat units derived from a first unsaturated amide, a hydroxy acrylate, and at least two monomers selected from the group consisting of (1) a vinyl pyridine or derivative thereof and acrylic acid or salt thereof, (2) a vinyl morpholine and a second unsaturated amide; (3) acrylic acid or salt thereof and a second unsaturated amide; (4) acrylic acid or salt thereof, a vinyl pyridine, and a vinyl morpholine; and combination of two or more thereof wherein said first unsaturated amide is not the same as said second unsaturated amide.

35 Claims, No Drawings

CEMENT COMPOSITION AND PROCESS THEREWITH

FIELD OF THE INVENTION

This invention relates to a polymer composition which can be used as cement additive, to a cement composition, and to a process for using the cement composition.

BACKGROUND OF THE INVENTION

Cement compositions are used in the oil and gas industry to cement the annular space in the well bore between the surrounding formation and the pipe or casing. Typically, the cement slurry is pumped down inside of the casing and back up the outside of the casing through the annular space. The amount of water that is used in forming the cement slurry varies depending upon the type of hydraulic cement selected and the job conditions at hand. The amount of water used can vary over a wide range, depending upon such factors as the required consistency of the slurry, the necessary density for the control of formation pressures, and upon the strength requirement for the particular job.

Many times the hydraulic cement must be placed within or next to a porous medium such as, for example, earthen strata in the well bore. When this happens, water tends to filter out of the slurry and into the strata during the setting of the cement. Many difficulties are related to an uncontrolled fluid loss of this type, such as uncontrolled setting rate, improper placement of the slurry, impaired strength properties, and contamination of the surrounding strata. These conditions are all undesirable in oil and gas well cementing operations.

Therefore, there is an ever-present need to develop a process for controlling the fluid loss of a cement composition. Controlling fluid loss of a cement composition can also improve the curability of the composition.

SUMMARY OF THE INVENTION

An object of this invention is to provide additives which will reduce the water loss from cement slurries. Another object of this invention is to provide additives that will prevent the loss of water from cement slurries which contains calcium sulfate. It is a further object of this invention to provide a method for reducing the water loss from cement slurries. It is yet another object of this invention to provide a method for reducing the water loss from cement slurries containing calcium sulfate. It is also an object of this invention to provide cement compositions having improved water loss properties. It is yet a further object of this invention to provide an improved method for cementing oil and gas wells. Other advantages and features of this invention will become more apparent as the invention is more fully disclosed herein below.

According to a first embodiment of this invention, a composition which can be used in an oil field application is provided. The composition comprises, consists essentially of, or consists of cement, liquid, and a fluid loss-controlling amount of a polymer. The composition can also comprise, consist essentially of, or consist of calcium sulfate, cement, liquid, and a fluid loss-controlling amount of a polymer.

According to a second embodiment of this invention, a process is provided which comprises introducing the composition disclosed in the first embodiment of this invention into a subterranean formation.

DETAILED DESCRIPTION OF THE INVENTION

The term "liquid" used in the present invention denotes water, a solution, a suspension, or combinations thereof wherein the suspension contains dissolved, partially dissolved, or undissolved substances such as salts. The presently preferred liquid is an aqueous liquid such as, for example, fresh water, sea water, or salt water. Examples of salts include metal salts. Generally, the total salts content can vary widely from, for instance, 1 to as high as 37.2 percent (%) by weight of water. The typical salts content of salt water can be in the range of from, for instance, about 10 to about 37.2 percent (%) by weight of water.

The term "controlling fluid loss" is synonymous to "preventing fluid loss".

According to the first embodiment of this invention, the additive is suitable for use with any hydraulic cement. The term hydraulic cement is meant to encompass any inorganic cement that hardens or sets under water. Hydraulic cements, for example, include portland cements, aluminous and pozzolan cements, and the like. Thus, for example, any of the class A-J cements listed in API Specification 10, Sections 2, Fifth Edition, Jul. 1, 1990. The term hydraulic cement is also intended to include cement admixes containing extenders such as gypsum, sodium silicate, bentonite, gilsonite, and other extenders. The term "hydraulic cement" is also intended to include cement admixes containing any appreciable amount of sand or aggregate material or such cement admixed with a granular filling material such as barite, hematite, ilmenite, and the like. Strength enhancers such as silica powder can also be employed. The term "hydraulic cement" is also intended to include cement admixes containing organic acids and organic sulfonates used as retarders and dispersants. Accelerators such as sodium chloride, potassium chloride, and calcium chloride can also be employed.

The amount of liquid employed to make up the hydraulic cement slurry is not critical. Generally the amount of liquid necessary to give a settable cement composition having the required characteristics will be an amount from about 10 to about 200, preferably about 25 to about 150 percent by weight, based on the weight of the dry hydraulic cement. As disclosed previously, the amount of liquid employed should be only such as is sufficient to produce a pumpable slurry.

The polymer present is generally an amount that is effective to control the fluid loss of the composition and can generally be present in the composition in the range of from about 0.05 to about 5%, preferably about 0.1 to about 3%, and most preferably 0.2 to 2%. Calcium sulfate, if present in the composition, can be in the range of about 0.1 to about 50%, preferably about 1 to about 25%, and most preferably 3 to 15%. All are by weight of cement.

According to this invention, any cement can be used in the composition of the invention such as, for example, a calcium sulfate-containing or gypsum-containing cement.

Any polymer that can prevent or control the fluid loss of a hydraulic cement composition can be used in this invention. The presently preferred polymer is a polymer which comprises, consists essentially of, or consists of repeat units or monomers derived from a first unsaturated amide, a hydroxy acrylate, and at least two monomers selected from the group consisting of (1) a vinyl pyridine or derivative thereof and acrylic acid or salt thereof; (2) a vinyl morpholine and a second unsaturated amide; (3) acrylic acid or salt thereof and a second unsaturated amide; (4) acrylic acid or salt thereof, a vinyl pyridine, and a vinyl morpholine; and combination of two or more thereof in which the first unsaturated amide is not the same as the second unsaturated amide.

An unsaturated amide useful in this invention, as the first or second unsaturated amide, can have the formula of (R)(R)—C=C(R)—C=O—N(R)(R) in which each R can be independently hydrogen or a hydrocarbyl radical having 1 to about 10 carbon atoms per radical. The hydrocarbyl radical can be alkyl radical, alkenyl radical, aryl radical, alkylaryl radical, arylalkyl radical, or combinations of two or more thereof. Examples of suitable unsaturated amides include, but are not limited to, acrylamide, methacrylamide, dimethylaminopropyl methacrylamide, N,N-dimethylacrylamide, N-vinylacetamide, N-methyl (meth) acrylamide, N-ethyl (meth) acrylamide, N-propyl (meth) acrylamide, N-vinyl formamide, and combinations of two or more thereof. The presently preferred first unsaturated amide is acrylamide and second unsaturated amide is dimethylamionopropyl methacrylamide for they are effective, when incorporated into the polymer, in controlling fluid loss of the composition of this invention.

A hydroxy acrylate useful in this invention generally has the formula of (R)(R)C=C(R)—C=O—O—A—OH in which each R is the same as that disclosed above and A is an alkylene radical having 1 to about 10 carbon atoms per radical. Examples of suitable hydroxy acrylates include, but are not limited to hydroxyethyl acrylate, hydroxybutyl acrylate, hydroxypropyl acrylate, hydroxycyclohexyl acrylate, phenyl hydroxyethyl acrylate, glycerol monoacrylate, glycerol monomethacrylate, hydroxybutyl methacrylate, hydroxyethyl methacrylate, hydroxypropyl methacrylate, and combinations of two or more thereof. The presently preferred hydroxy acrylate is hydroxyethyl acrylate.

Any vinyl pyridine or derivative thereof that, when incorporated into the polymer, can effect the fluid loss control can be used in this invention. Examples of vinyl pyridine derivatives include, but are not limited to, 4-vinyl pyridine, 2-vinyl pyridine, vinyl pyridylacetic acid, vinyl pyridylacetonitrile, dicarbonitrile vinyl pyridine, vinylpyridine-N-oxide, alkyl-substituted vinylpyridine, such as 2-methyl-4-vinylpyridine, aryl-substituted vinylpyridine such as 2-phenyl-4-vinylpyridine, and combinations of two or more thereof.

Suitable salts of acrylic acid are generally ammonium or metal salts. Among the metal salts of acrylic acids, alkali metal salts are preferred. Examples of alkali metal salts of acrylic acid are lithium acrylate, sodium acrylate, potassium acrylate, and cesium acrylate.

A vinyl morpholine suitable for use in this invention can have the formula of R—C(R)=C(R)—(C=O)$_m$—M wherein each R is the same as that disclosed above, m is 0 or 1, and M is morpholine group which can be substituted or nonsubstituted. Examples of suitable vinyl morpholines include, but are not limited to, N-vinyl morpholine, N-acryloyl morpholine, N-methacryloyl morpholine, and combinations of two or more thereof.

The above-disclosed polymers can be produced by mixing the monomers in desired molar ratios in an appropriate liquid medium and then initiating the free-radical polymerization in solution, suspension, or emulsion environment. Generally, any molar ratios can be employed depending on the final polymer desired. The liquid can be the same as that disclosed above.

Well known compounds commonly employed to initiate free radical polymerization reactions include hydrogen peroxide, azo compounds such as, for example, 2,2'-azobis (2-(2-imidazolin-2-yl)propane) dihydrochloride, alkali metal persulfates such as $K_2S_2O_8$, alkali metal perborates, alkali metal perphosphates, and alkali metal percarbonates. Well known organic peroxide compounds commonly employed to initiate free radical polymerization reactions include lauryl peroxide, 2,5-dimethyl-2,5-bis(2-ethylhexanoylperoxy)hexane, t-butylperoxyprivilate, t-butylperoctoate, p-methane hydroperoxide, and benzoylperoxide. The compound t-butylhyponitrite is a well known alkyl hyponitrite commonly employed to initiate free radical polymerization reactions. Furthermore, ultraviolet light and gamma irradiation are commonly employed to initiate free radical polymerization reactions. In addition, such other method of polymerization as would have occurred to one skilled in the art may be employed, and the present invention is not limited to the particular method of producing the polymer set out herein. Because the polymerization techniques are well known to one skilled in the art, the description of which is omitted herein for the interest of brevity. The present preferred polymerization is solution polymerization.

The molar ratio of each repeat unit or monomer to the first unsaturated amide can be any ratio so long as the ratio can produce a polymer that can control the fluid loss of a cement composition. Generally, the molar ratio can be in the range of from about 0.001:1 to about 10:1, preferably about 0.005:1 to about 5:1, and most preferably 0.01:1 to 1:1.

The composition disclosed in the first embodiment can be produced by any means known to one skilled in the art. For example, the composition can be produced by combining such as mixing, blending, or dispersing a cement, a fluid loss-controlling amount of a polymer, a liquid, and optionally calcium sulfate. Because the means are well known to one skilled in the art, the description of which is omitted herein for the interest of brevity.

A process for controlling fluid loss of a hydraulic cement composition, which comprises a cement and a liquid, both of which are disclosed above, is provided. The process comprises combining the hydraulic cement composition with a fluid loss-controlling amount of polymer. The scope and definition of the polymer are the same as those disclosed above. The amount of each of the cement, liquid, polymer, or calcium sulfate when present can be the same as that disclosed above in the first embodiment.

According to the second embodiment of this invention, a process which can be used in hydrocarbon-bearing subterranean formations such as forming or cementing a casing is provided. The process comprises, or consisting essentially of, or consisting of, introducing a composition into a subterranean formation. The composition comprises, consists essentially of, or consists of cement, a polymer, and optionally calcium sulfate. The scope of the composition is the same as that disclosed in the first embodiment of the present invention, description of which is omitted herein for the interest of brevity.

The term "process" used herein and hereinafter in conjunction with a subterranean formation can comprise a use in cement slurries, fluid loss prevention, or both.

The introduction of the composition into a subterranean formation can be carried out by any methods known to one skilled in the art. Generally the cement, liquid, polymer, and optional calcium sulfate can be combined to produce a fluid or hydraulic composition. The composition can then be introduced, by any means known to one skilled in the art such as pumping, into a wellbore in a subterranean formation. The nature of the formation is not critical to carrying out the process of the present invention.

The following examples are provided to merely illustrate this invention and are not to be construed as to unduly limit the scope of this invention.

EXAMPLE 1

Preparation of 10 VP/10 NaAC/80 AM polymer

All of the monomer ratios used in this and the following polymerization examples are in mole percent. The polymerization was conducted in a 1 liter jacketed resin flask equipped with a thermocouple, nitrogen sparger, reflux condenser with an oil bubbler, and a mechanical stirrer fitted with a stainless steel axial flow impeller. The jacket water temperature was maintained at 60° C. The polymerization was conducted in deionized water at a solids loading of 20 weight percent. Tetrasodium ethylenediaminetetraacetic acid (EDTA) was added at 0.05 PHM (parts per hundred parts monomer) to chelate metals that were present. Sodium persulfate was used to initiate the polymerization at a rate of 0.3 PHM (parts per hundred parts monomer). All of the monomers were commercially available and used as received.

The reactor was charged with: 289 g deionized water, 0.050 g EDTA, 13.7 g 4-vinyl pyridine (VP, Reilly Industries), 49 g 25 weight percent sodium acrylate solution (NaAC, prepared by neutralizing acrylic acid (Aldrich Chemical Co.) with sodium hydroxide), and 148.1 g 50 weight percent aqueous acrylamide (AM) solution (CYTEK Industries). The reactor charge was sparged with nitrogen for 10 minutes to remove oxygen. Sodium persulfate (0.3 PHM), dissolved in a minimal quantity of deionized water, was then added to initiate polymerization. The reaction mixture was allowed to stir until the viscosity had increased to the point where the vortex was lost and the solution was starting to climb up the shaft. Stirring was then stopped and the impeller shaft was raised above the solution level to simplify removal of the polymer gel. After the reaction exotherm had subsided, the jacket heat was shut off, the reactor was allowed to cool to room temperature, and the product was removed. A 0.5 weight percent solution of the above polymer in deionized water was found to have a Brookfield viscosity of 80 cP (#1 spindle, 10 rpm).

EXAMPLE 2

Preparation of 5 VP/10 NaAC/85 AM polymer

The above polymer was prepared at 20 weight percent solids using the procedure of example 1 to yield a product which was found to have a Brookfield viscosity of 65 cP (0.5 weight percent polymer in deionized water, #1 spindle, 10 rpm).

EXAMPLE 3

5 VP/10 HEA/5 NaAC/80 AM

A mixture of 4-vinyl pyridine, 2-hydroxyethyl acrylate (HEA, Aldrich Chemical Co.), sodium acrylate, and acrylamide was polymerized at 20 weight percent solids, using the procedure of Example 1 to give a polymer that had Brookfield viscosity of 5300 cP (0.5 weight percent polymer in deionized water, #3 spindle, 10 rpm).

EXAMPLES 4–8

The polymers shown in Table I were produced at 25 weight percent solids using the procedure of Example 1.

TABLE I

| Polymer | Batch Size | cP[a] | Spindle | rpm |
|---|---|---|---|---|
| 5 VP/5 NAM[b]/10 HEA/5 NaAC 75 AM | 500 g | 2250 | #3 | 20 |
| 5 VP/10 HEA/10 NaAC/75 AM | 500 g | 10340 | #5 | 20 |
| 5 VP/10 HEA/20 NaAC/65 AM | 500 g | 9300 | #5 | 20 |
| 5 VP/10 HEA/30 NaAC/55 AM | 500 g | 10000 | #5 | 20 |
| 5 VP/5 NAM/10 HEA/5 NaAC/ 75 AM | 1500 g | 2000 | #3 | 20 |

[a]Brookfield viscosity of 0.5 weight percent polymer in deionized water.
[b]NAM = N-acryloyl morpholine (Polysciences, Inc.)

EXAMPLE 9

10 VP/10 HEA/5 NaAC/75 AM

The above polymer was prepared at 20 weight percent solids loading in deionized water using the procedure of Example 1 except that an additional 0.3 PHM of sodium persulfate needed to be added to initiate the polymerization. A 0.5 weight percent solution of the polymer in deionized water was found to have a Brookfield viscosity of 210 cP (#1 spindle, 10 rpm).

EXAMPLE 10

5 DAPM/10 HEA/5 NaAC/80 AM

The above polymer was prepared using the equipment described in Example 1 at 25 weight percent solids and an initiation temperature of 10C. An iron stock solution was prepared by dissolving 0.0431 g of ferric ammonium sulfate and 0.25 g of EDTA in water and diluting to 500 mL. The reactor was charged with: 13.03 g N-[3-(dimethylamino) propyl]methacrylamide (DAPM, Aldrich Chemical Co.), 17.77 g HEA, 28.78 g 25 weight percent NaAC, 174.02 g 50 weight percent AM, 0.063 g EDTA, 1 mL iron solution (0.8E-5 phm Fe), 0.125 g sodium formaldehyde sulfoxylate (0.1 phm, Aceto Corp.) and 266.4 g deionized water. The reaction mixture was cooled to about 10° C. with stirring and deoxygenated for 10 minutes. Polymerization was initiated by the addition of 0.125 g sodium persulfate (0.1 phm).

The viscosity of the reaction mixture rapidly increased and the stirrer was shut-off after about 2.5 minutes. After about 2 hours, the heat of polymerization had subsided, the cooling water was shut-off and the product was allowed to warm to room temperature. The Brookfield viscosity of a 0.5 weight percent solution of the polymer in deionized water was 1350 cP (#3 spindle, 20 rpm).

EXAMPLE 11

5 NAM/5 DAPM/10 HEA/5 NaAC/75 AM

The above polymer was prepared at 25 weight percent solids in deionized water, and a 500 g batch size, using the procedure of Example 10, to give a polymer which had a Brookfield viscosity of 170 cP at a concentration of 0.5 weight percent polymer in deionized water (#3 spindle, 20 rpm).

EXAMPLE 12

This example shows that the polymers produced in Examples 1–11 control or prevent fluid loss of a hydraulic cement composition.

The cementing slurry compositions in accordance with the present invention and having the compositions as noted in Table II below were prepared by mixing some of the polymers produced in Examples 1–11 with fresh water, cement (API Class H and Class C cements as defined in API Specification 10, Section 2, Fifth Edition, Jul. 1, 1990; the Class H cement used was commercially available from General Portland under the brand name JOPPA H®. The Class C cement used was commercially available from Southwestern Portland under the brand name SOUTH-WESTERN C®), and optionally calcium sulfate. The slurries were prepared in accordance with API Specification 10, Fifth Edition, Section 5, Jul. 1, 1990 and are shown in Table II.

TABLE II

| Slurry ID. | Cement Class | Cement (g) | Lomar ®D$^a$ (g) | Gypsum (g) | Water (g) | Water Type |
|---|---|---|---|---|---|---|
| A | H | 800 | 0 | 0 | 322.47 | Fresh |
| B | H | 800 | 4.0 | 0 | 322.47 | Fresh |
| C | C | 350 | 0 | 42 | 473.83 | Fresh |
| D | C | 350 | 0 | 42 | 471.91 | Fresh |
| E | H | 350 | 0 | 42 | 473.83 | Fresh |
| F | H | 350 | 0 | 42 | 471.91 | Fresh |

$^a$Lomar ®D is a trademark of Hinkle Chemical Corporation and is a sodium salt of the formaldehyde condensation product of naphthalene sulfonic acid.

The fluid loss values for the slurries shown in Table II were measured in accordance with API Specification 10, Fifth Edition, Appendix F, Jul. 1, 1990. The results are shown in Table III.

TABLE III

| Slurry ID. | Polymer Mole Fraction | Polymer (g) | 100° F. Fluid Loss ml/30 minutes | 150° F. Fluid Loss ml/30 minutes |
|---|---|---|---|---|
| A | None | 0 | >1000 | >1000 |
| B | None | 0 | N.D.$^a$ | N.D. |
| A | 5 VP/10 HEA/ 5 NaAC/80 AM | 1.92 | 172 | 316 |
| B | 5 VP/10 HEA/ 5 NaAC/80 AM | 1.92 | 40 | 62 |
| A | 10 VP/10 HEA/ 5 NaAC/75 AM | 1.92 | 186 | 411 |
| B | 10 VP/10 HEA/ 5 NaAC/75 AM | 1.92 | 38 | 54 |
| A | 5 VP/10 NaAC/ 85 AM | 1.92 | 274 | N.D. |
| B | 5 VP/10 NaAC/ 55 AM | 1.92 | 128 | N.D. |
| A | 10 VP/10 NaAC/ 80 AM | 1.92 | 551 | N.D. |
| B | 10 VP/10 NaAC/ 80 AM | 1.92 | 264 | N.D. |
| C | 5 NAM/5 DAPM/10 HEA/5 NaAC/75 AM | 1.92 | 1183 | N.D. |
| C | 5 VP/10 HEA/ 10 NaAC/75 AM | 3.84 | 144 | N.D. |
| C | 5 VP/10 HEA/ 20 NaAC/65 AM | 3.84 | 164 | N.D. |
| C | 5 VP/10 HEA/ 30 NaAC/55 AM | 3.84 | 224 | N.D. |
| D | 5 VP/10 HEA/ 10 NaAC/75 AM | 3.84 | 204 | N.D. |
| D | 5 VP/10 HEA/ 20 NaAC/65 AM | 3.84 | 270 | N.D. |
| D | 5 VP/10 HEA/ 30 NaAC/55 AM | 3.84 | 380 | N.D. |
| D | 5 NAM/5 DAPM/ 10 HEA/5 NaAC/75 AM | 3.84 | 110 | N.D. |
| D$^1$ | 5 DAPM/10 HEA/5 NaAC/80 AM | 3.84 | 196 | N.D. |
| E | 5 NAM/5 DAPM/ 10 HEA/5 NaAC/75 AM | 1.92 | 910 | N.D. |
| F | 5 NAM/5 DAPM/ 10 HEA/5 NaAC/75 AM | 3.84 | 170 | N.D. |
| F | 5 DAPM/10 HEA/ 5 NaAC/80 AM | 3.84 | 166 | N.D. |

$^a$N.D., not determined

The results shown in Table III show that addition of a polymer disclosed in the invention greatly decrease the fluid loss at elevated temperatures.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A composition comprising cement and a polymer which comprises repeat units derived from a first unsaturated amide, a hydroxy acrylate, and at least two monomers selected from the group consisting of (1) acrylic acid or a salt thereof and a monomer selected from the group consisting of 4-vinyl pyridine 2-vinyl pyridine, vinylpyridylacetic acid, vinyl pyridylacetonitrile, dicarbonitrile vinyl pyridine, vinylpyridine-N-oxide, 2-methyl-4-vinylpyridine, 2-phenyl-4-vinylpyridine, and combinations of two or more thereof; (2) a vinyl morpholine and a second unsaturated amide; (3) acrylic acid salt selected from the group consisting of ammonium and metal salts of acrylic acid and a second unsaturated amide; (4) acrylic acid or salt thereof, a vinyl pyridine, and a vinyl morpholine; and combination of two or more thereof wherein said first unsaturated amide is not the same as said second unsaturated amide.

2. A composition according to claim 1 wherein said first unsaturated amide or second unsaturated amide has the formula of (R)(R)—C=C(R)—C(O)—N(R)(R) and each R is independently selected from the group consisting of hydrogen, hydrocarbyl radicals, and combinations thereof.

3. A composition according to claim 1 wherein said first unsaturated amide or second unsaturated amide is selected from the group consisting of acrylamide, methacrylamide, dimethylaminopropyl methacrylamide, N,N-dimethylacrylamide, N-vinylacetamide, N-methyl (meth) acrylamide, N-ethyl (meth) acrylamide, N-propyl (meth) acrylamide, N-vinyl formamide, and combinations of two or more thereof.

4. A composition according to claim 1 wherein said first unsaturated amide is acrylamide.

5. A composition according to claim 1 wherein said second unsaturated amide is dimethylaminopropyl methacrylamide.

6. A composition according to claim 4 wherein said second unsaturated amide is dimethylaminopropyl methacrylamide.

7. A composition according to claim 1 wherein said hydroxy acrylate has the formula of (R)(R)C=C(O)—O—A—OH; each R is independently selected from the group consisting of hydrogen, hydrocarbyl radicals, and combinations thereof; and A is an alkylene radical.

8. A composition according to claim 1 wherein said hydroxy acrylate is selected from the group consisting of hydroxyethyl acrylate, hydroxybutyl acrylate, hydroxypropyl acrylate, hydroxycyclohexyl acrylate, phenyl hydroxyethyl acrylate, glycerol monoacrylate, glycerol monomethacrylate, hydroxybutyl methacrylate, hydroxyethyl methacrylate, hydroxypropyl methacrylate, and combinations of two or more thereof.

9. A composition according to claim 1 wherein said hydroxy acrylate is hydroxyethyl acrylate.

10. A composition according to claim 6 wherein said hydroxy acrylate is hydroxyethyl acrylate.

11. A composition according to claim 1 wherein said salt of acrylic acid is sodium acrylate.

12. A composition according to claim 10 wherein said salt of acrylic acid is sodium acrylate.

13. A composition according to claim 1 wherein said vinyl pyridine is 4-vinyl pyridine.

14. A composition according to claim 12 wherein said vinyl pyridine is 4-vinyl pyridine.

15. A composition according to claim 1 wherein said vinyl morpholine has the formula of R—C(R)=(R)—(C=O)$_m$—M wherein each R is independently selected from the group consisting of hydrogen, hydrocarbyl radicals, and combinations thereof; M is a morpholine group; and m is 1 or 0.

16. A composition according to claim 1 wherein said vinyl morpholine is N-acryloyl morpholine.

17. A composition according to claim 15 wherein said vinyl morpholine is N-acryloyl morpholine.

18. A composition according to claim 1 further comprising calcium sulfate.

19. A composition according to claim 17 further comprising calcium sulfate.

20. A composition according to claim 1 wherein said repeat units are derived from acrylamide, hydroxyethyl acrylate, and at least two monomers selected from the group consisting of (1) 4-vinyl pyridine and sodium acrylate; (2) N-acryloyl morpholine and dimethylaminopropyl methacrylamide; (3) sodium acrylate and dimethylaminopropyl methacrylamide; (4) sodium acrylate, 4-vinyl pyridine, and N-acryloyl morpholine; and combinations of two or more thereof.

21. A composition comprising a cement and a polymer which consists essentially of repeat units derived from acrylamide, hydroxyethyl acrylate, and at least two monomers selected from the group consisting of (1) 4-vinyl pyridine and sodium acrylate; (2) N-acryloyl morpholine and dimethylaminopropyl methacrylamide; (3) sodium acrylate and dimethylaminopropyl methacrylamide; (4) sodium acrylate, 4-vinyl pyridine, and N-acryloyl morpholine; and combinations of two or more thereof.

22. A composition according to claim 25 further comprising a calcium sulfate.

23. A composition according to claim 22 further comprising a liquid.

24. A composition according to claim 23 wherein said polymer is present in said composition in the range of from 0.2 to 2 weight %.

25. A process comprising introducing a composition into a subterranean formation wherein said composition comprises cement, calcium sulfate and a polymer which comprises repeat units derived from a first unsaturated amide, a hydroxy acrylate, and at least two monomers selected from the group consisting of (1) acrylic acid or a salt thereof and a monomer selected from the group consisting of 4-vinyl pyridine, 2-vinyl pyridine, vinylpridylacetic acid, vinyl pyridylacetonitrile, dicarbonitrile vinyl pyridine, vinylpyridine-N-oxide, 2-methyl-4-vinylpyridine, 2-phenyl-4-vinylpyridine, and combinations of two or more thereof; (2) a vinyl morpholine and a second unsaturated amide; (3) acrylic acid salt selected from the group consisting of ammonium and metal salts of acrylic acid and a second unsaturated amide; (4) acrylic acid or salt thereof, a vinyl pyridine, and a vinyl morpholine; and combination of two or more thereof wherein said first unsaturated amide is not the same as said second unsaturated amide.

26. A process according to claim 25 wherein said first unsaturated amide or second unsaturated amide has the formula of (R)(R)—C=C(R)—C(O)—N(R)(R) and each R is independently selected from the group consisting of hydrogen, hydrocarbyl radicals, and combinations thereof.

27. A process according to claim 25 wherein said hydroxy acrylate has the formula of (R)(R)C=C(O)—O—A—OH; each R is independently selected from the group consisting of hydrogen, hydrocarbyl radicals, and combinations thereof; and A is an alkylene radical.

28. A process according to claim 25 wherein said vinyl morpholine has the formula of R—C(R)=(R)—(C=O)$_m$—M wherein each R is independently selected from the group consisting hydrogen, hydrocarbyl radicals, and combinations thereof; M is a morpholine group; and m is 1 or 0.

29. A process according to claim 25 wherein said first unsaturated amide or second unsaturated amide has the formula of (R)(R)—C=C(R)—C(O)—N(R)(R); said hydroxy acrylate has the formula of (R)(R)C=C(O)—O—A—OH; said vinyl morpholine has the formula of R—C(R)=(R)—(C=O)$_m$—M; each R is independently selected from the group consisting of hydrogen, hydrocarbyl radicals, and combinations thereof; M is a morpholine group; m is 1 or 0; and A is an alkenylene radical.

30. A process according to claim 29 wherein said first unsaturated amide is acrylamide; said second unsaturated amide is dimethylaminopropyl methacrylamide; said hydroxy acrylate is hydroxyethyl acrylate; said salt of acrylic acid is sodium acrylate; said vinyl pyridine is 4-vinyl pyridine; and said vinyl morpholine is N-acryloyl morpholine.

31. A process according to claim 25 wherein said polymer comprises repeat units derived from acrylamide, hydroxyethyl acrylate, and at least two monomers selected from the group consisting of (1) 4-vinyl pyridine and sodium acrylate; (2) N-acryloyl morpholine and dimethylaminopropyl methacrylamide; (3) sodium acrylate and dimethylaminopropyl methacrylamide; (4) sodium acrylate, 4-vinyl pyridine, and N-acryloyl morpholine; and combinations of two or more thereof.

32. A process according to claim 25 wherein said composition further comprises calcium sulfate.

33. A process according to claim 31 wherein said composition further comprises calcium sulfate.

34. A process according to claim 33 wherein said composition further comprises water.

35. A process comprising contacting a subterranean formation with a composition comprising cement, calcium sulfate and a polymer which polymer comprises repeat units derived from acrylamide, hydroxyethyl acrylate, and at least two monomers selected from the group consisting of (1) 4-vinyl pyridine and sodium acrylate; (2) N-acryloyl morpholine and dimethylaminopropyl methacrylamide; (3) sodium acrylate and dimethylaminopropyl methacrylamide; (4) sodium acrylate, 4-vinyl pyridine, and N-acryloyl morpholine; and combinations of two or more thereof.

* * * * *